Nov. 10, 1964    R. L. TWEEDALE    3,156,201
VACUUM-TYPE SEED PLANTER
Filed Nov. 7, 1962

INVENTOR.
RALPH L. TWEEDALE 3,156,201
VACUUM-TYPE SEED PLANTER
Ralph L. Tweedale, Southfield, Mich., assignor to Massey-Ferguson Inc., Detroit, Mich., a corporation of Maryland
Filed Nov. 7, 1962, Ser. No. 236,077
1 Claim. (Cl. 111—77)

This invention relates generally to vacuum-type seed planters and concerns, more particularly, an improved flexibile wall distributing drum for such planters.

A typical vacuum-type seed planter includes a seed carrying hopper disposed over a furrow opening drill having a hollow center. A suction drum is rotatably mounted on the planter and formed with peripheral openings so that seeds are "sucked" against the drum openings and are carried over the apertures from the hopper to the hollow centered drill.

The invention lies in providing such a planter drum with a flexibly surfaced cylindrical wall in which the seed carrying apertures are formed so that seeds seat firmly and sealingly over the apertures as they are carried from the hopper to the drill. More particularly, the invention contemplates forming the cylindrical drum wall as a laminate having an internal ply sufficiently rigid to maintain a substantial cylindrical shape, a soft central core portion of substantial thickness, and an outer ply of resilient material yieldable in conformity to the shape of a seed drawn against said drum.

An example of the inventive vacuum-type seed planter is shown in the accompanying drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
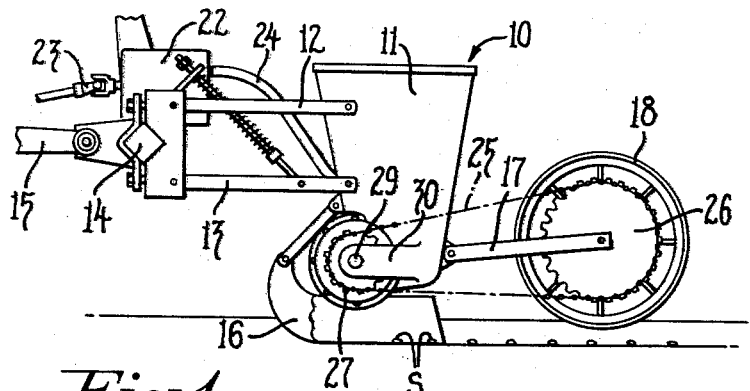
FIGURE 1 is a side elevation of a seed planter embodying the present invention.

Turning first to FIGURE 1, there is shown a vacuum-type seed planter 10 which embodies the invention and includes a seed hopper 11 supported by horizontal links 12 and 13 pivoted to a tool bar 14 which is adapted to be drawn by the rear links 15 of a conventional tractor. It will be understood that while a single row planter 10 is herein described, additional planter units may be ganged transversely on the tool bar 14. Disposed below the seed hopper 11 is a furrow opening drill 16 having a hollow center through which the seeds are deposited into the ground. Trailing behind the seed hopper 11 on a pivotally mounted draw link 17 is a ground engaging press wheel 18 which travels along the furrow opened by the drill 16 in order to close the furrow over the seeds which have been deposited.

Figure 2:
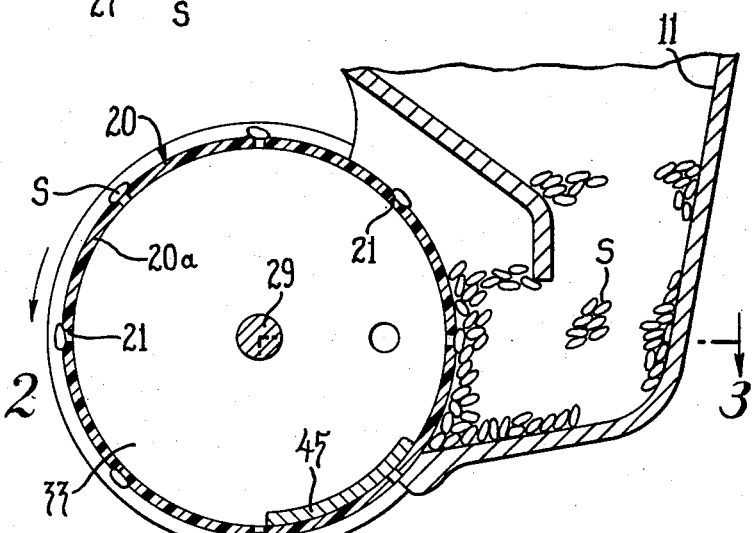
FIG. 2 is an enlarged partial section showing the vacuum seed drum mechanism.
Figure 3:
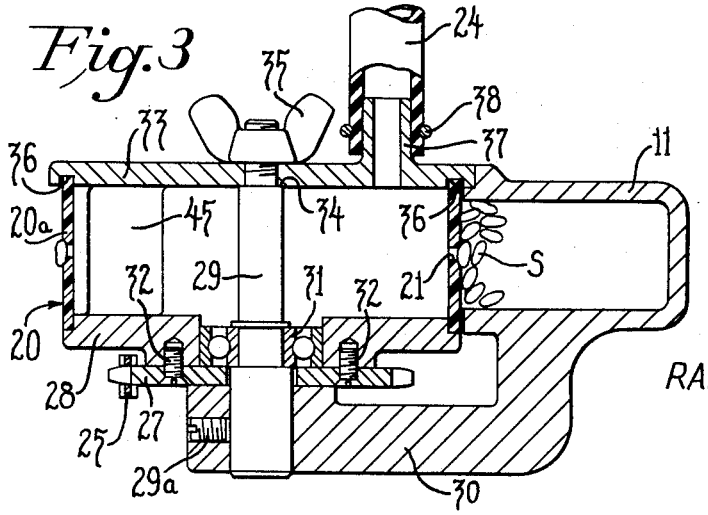
FIG. 3 is a section taken substantially along the line 3—3 in FIG. 2.

For distributing the seeds S from the hopper 11 in spaced relation in the open furrow there is included a seed engaging drum 20 with a cylindrical wall 20a having a plurality of circumferentially spaced apertures 21 against which the seeds S are drawn by suction within the drum 20. (See FIGS. 2 and 3.) The suction in this case is generated by a vacuum pump 22 mounted on the tool bar 14 and driven by a coupling 23 powered by the power take-off on the tractor. The vacuum pump 22 is coupled to the seed drum 20 by means of a flexible conduit 24.

In order to carry the seeds from the hopper 11 to the drill 16, the seed drum 20 is rotatably driven by a drive chain 25 which is trained about a drive sprocket 26 fixed to the press wheel 18 and a driven sprocket 27 secured to a rotatable side plate 28 on which the drum 20 is mounted. The side plate 28 is mounted for rotation about a transverse bolt 29 carried on a forwardly projecting extension 30 integrally formed with the hopper 11. A bearing 31 journals the side plate 28 on the shaft 29, which is locked against rotation by a set screw 29a, and the driven sprocket 27 is rigidly fixed to the side plate 28 by screws 32.

To close the side of the seed drum 20 opposite from the plate 28, an inner plate 33 is mounted on the cross bolt 29 and locked against a shoulder 34 on the bolt by a wing nut 35. A peripheral groove 36 is formed in the side plate 33 for retaining an edge portion of the cylindrical drum wall 20a while allowing the drum wall to rotate within the groove. The side plate 33 is also provided with an integrally formed nipple 37 to which the conduit 24 is secured by means of a clamp ring 38 in order that a vacuum may be developed within the drum 20 by the pump 22.

Figure 4:
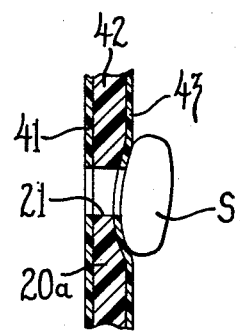
FIG. 4 is a greatly enlarged fragmentary section of a portion of the seed drum.

Pursuant to the present invention, the cylindrical drum wall 20a is constructed of a resilient or flexible material so that seeds drawn against the apertures 21 by the vacuum will seat firmly against the surface of the drum. In the illustrated embodiment the flexible wall 20a is formed of a laminated or multiple ply construction having a firm inner ply 41 adapted to maintain the drum in substantially circular shape. Overlying the inner ply 41 is a substantially thicker, central core 42 of soft foam-type plastic or rubber material which is deformable under pressure. A tough, wear resistant outer ply 43 of resilient material covers the central core 42. The outer ply 43 is flexible in order to assume the shape of the seeds drawn against the apertures 21. Thus, as seen in FIG. 4, a seed which is drawn against the flexible drum wall 20a causes the outer ply 43 to yield in conformity to the shape of the seed and thus completely seal the aperture 21 so as to maintain the vacuum within the drum 20.

In order that the seeds may be deposited into the hollow drill 16, a vacuum cut-off is provided which releases the individual seeds to be dropped. In the present instance the vacuum cut-off comprises an arcuate valve plate 45 integrally formed with the side plate 33 and extending inwardly to the plate 28 adjacent the inner periphery of the drum 20. As the drum 20 rotates, each of the apertures 21 succeedingly pass over the outer surface of the valve plate 45 thereby blocking the vacuum force drawing the seed against the drum wall 20a in sealing relationship with the aperture 21. Accordingly, the seed is freed to drop into the drill 16.

It will also be understood that the spacing of the individually deposited seeds is a function of the rotational speed of the drum 20 with respect to the rate of forward travel of the drill 10, together with the circumferential spacing of the apertures 21. In the preferred embodiment, the rotational speed of the drum 20 is arranged so that the rearward speed of the seeds drawn against the drum, at the point where they are released by the valve plate 45, is equal to the forward speed of the drill 10. That is, the relative speed between the ground and the drum wall 20a is zero. In this way, the seeds drop substantially vertically since there is essentially no relative velocity imparted to the individual seeds.

While the seeds in the present instance are illustrated in the form of beans, the flexible drum 20 permits seeds having other shapes to be planted in a uniform manner. In this regard, it will be appreciated that the apertures 21 are in each case smaller than the seeds to be planted thereby insuring that the seeds are not drawn inside the drum.

To change the flexible drum 20 to accommodate seeds of different sizes, the wing nut 35 and the plate 33 are released. The flexible drum 20 may then be removed from mounting plate 28 and a new flexible drum with different size peripheral apertures can be inserted. The plate 33 and wing nut 35 are then reinstalled.

The embodiments of the invention in which an exclusive property or privilege is claimed are defined as follows:

A vacuum-type seed planter having a seed carrying hopper disposed over a furrow opening drill and a suction drum with peripheral apertures rotatably mounted so that seeds are carried over said apertures from the hopper to the drill, characterized by said drum having a flexible surfaced cylindrical wall in which said apertures are formed so that seeds seat firmly and sealingly over said apertures as they are carried from the hopper to said drill, said drum wall being formed of a laminated construction having an internal ply sufficiently rigid to maintain a substantial cylindrical shape, a soft center core portion of substantial thickness, and an outer ply of resilient material yieldable in conformity to the shape of a seed drawn against said drum.

References Cited in the file of this patent

UNITED STATES PATENTS

| | | |
|---|---|---|
| 1,006,984 | Sheetz | Oct. 24, 1911 |
| 1,331,235 | Bristow | Feb. 7, 1920 |
| 1,746,821 | Davis | Feb. 11, 1930 |
| 2,121,650 | Berman | June 21, 1938 |
| 2,455,701 | Putman et al. | Dec. 7, 1948 |
| 2,789,736 | Agnoletto | Apr. 23, 1957 |
| 2,931,325 | Thelander | Apr. 5, 1960 |
| 2,955,550 | Downey | Oct. 11, 1960 |
| 2,960,258 | Dodwell | Nov. 15, 1960 |
| 3,022,755 | Roepke | Feb. 27, 1962 |

FOREIGN PATENTS

| | | |
|---|---|---|
| 218,569 | Australia | Nov. 12, 1958 |